(12) United States Patent
Lane

(10) Patent No.: US 6,547,269 B2
(45) Date of Patent: Apr. 15, 2003

(54) STEERING ASSEMBLY FOR A MOTORCYCLE

(75) Inventor: Robert J. Lane, Newport Beach, CA (US)

(73) Assignee: Alloy Art, Inc., Glendora, CA (US)

( * ) Notice: Subject to any disclaimer, the term of this patent is extended or adjusted under 35 U.S.C. 154(b) by 0 days.

(21) Appl. No.: 09/969,835

(22) Filed: Oct. 1, 2001

(65) Prior Publication Data

US 2002/0074770 A1 Jun. 20, 2002

Related U.S. Application Data

(60) Provisional application No. 60/236,473, filed on Sep. 29, 2000.

(51) Int. Cl.[7] ............................................... B62K 21/04
(52) U.S. Cl. ....................................................... 280/280
(58) Field of Search ................................ 280/279, 280, 280/274; 180/219

(56) References Cited

U.S. PATENT DOCUMENTS

| | | | |
|---|---|---|---|
| 4,379,584 A | * 4/1983 | Willey | ........................ 296/78.1 |
| 5,967,538 A | 10/1999 | Callaluca et al. | |
| 6,035,741 A | * 3/2000 | Krizman, Jr. | .............. 74/551.8 |
| 6,176,503 B1 | 1/2001 | George | |
| 2002/0088285 A1 | * 7/2002 | Carrick | ...................... 73/866.3 |

* cited by examiner

Primary Examiner—Kevin Hurley
(74) Attorney, Agent, or Firm—Knobbe, Martens, Olson & Bear, LLP

(57) ABSTRACT

A steering assembly for a motorcycle is provided, comprising a front fork assembly, a handlebar assembly, and one or more riser assemblies connecting the handlebar assembly to the fork assembly. The front fork assembly comprises a pair of elongated fork legs. Each of the fork legs has an upper end and a lower end, and a cross-member extending between the fork legs adjacent the upper ends. Each of the riser assemblies comprises a riser extending between the handlebar assembly and the cross-member, an upper bushing, and a lower bushing. Each of the upper and lower bushings comprises an inner member comprising a tubular stem and a collar extending radially outwardly from an end of the stem, and an outer member comprising a tubular portion surrounding the stem and a lip extending radially outwardly from an end of the tubular portion adjacent the collar. The upper bushing extends from above the cross-member into a hole provided through the cross-member. The lower bushing extends from below the cross-member into the hole. A fastener extends through the hole from the lower bushing to the riser.

14 Claims, 8 Drawing Sheets

STEERING ASSEMBLY FOR A MOTORCYCLE

RELATED APPLICATIONS

This application claims priority to U.S. Provisional Application No. 60/236,473, filed Sep. 29, 2000, the entire contents of which is hereby incorporated by reference herein.

BACKGROUND OF THE INVENTION

1. Field of the Invention

The present invention relates to motorcycle steering assemblies and, more particularly, to riser assemblies for motorcycle steering assemblies.

2. Description of the Related Art

In conventional motorcycles, the handlebar assembly is typically connected to the front fork assembly of the motorcycle by one or more riser assemblies. The riser assemblies typically serve both to transmit forces from the handlebar assembly to the front fork assembly for steering the motorcycle and to isolate engine and road vibrations from the handlebar assembly.

In order to isolate the handlebar assembly from engine and road vibrations, prior art riser assemblies typically incorporate rubber bushings at the interfaces between the riser assemblies and the front fork assembly. While the rubber bushings have served to isolate the handlebar assembly from vibrations, however, the relatively soft rubber bushings allow the handlebar assembly to flex back and forth slightly when forces are applied to the handlebar assembly during operation of the motorcycle. This undesirably results in a "sloppy" steering feel and, because the operator uses the handlebar assembly for balance and support, can in fact be dangerous in some cases.

Accordingly, it is an object of the present invention to provide a more rigid attachment of the handlebar assembly to the front fork assembly while isolating the handlebar assembly from engine and road vibrations.

SUMMARY OF THE INVENTION

The riser assembly disclosed herein overcomes the problems of the prior art and can conveniently be retrofitted on a number of existing motorcycle models. In accordance with one aspect of the present invention, a steering assembly is provided comprising a front fork assembly, a handlebar assembly, and one or more riser assemblies connecting the handlebar assembly to the fork assembly. The front fork assembly comprises a pair of elongated fork legs. Each of the fork legs has an upper end and a lower end, and a cross-member extending between the fork legs adjacent the upper ends. Each of the riser assemblies comprises a riser extending between the handlebar assembly and the cross-member, an upper bushing, and a lower bushing. Each of the upper and lower bushings comprises an inner member comprising a tubular stem and a collar extending radially outwardly from an end of the stem, and an outer member comprising a tubular portion surrounding the stem and a lip extending radially outwardly from an end of the tubular portion adjacent the collar. The upper bushing extends from above the cross-member into a hole provided through the cross-member. The lower bushing extends from below the cross-member into the hole. A fastener extends through the hole from the lower bushing to the riser to secure the riser assembly to the cross member.

In accordance with another aspect of the present invention, a riser assembly is provided for a motorcycle having a handlebar assembly and a front fork assembly comprising a pair of elongated fork legs and a cross-member extending between the fork legs. The riser assembly comprises a riser extending between the handlebar assembly and the cross-member, an upper bushing, and a lower bushing. Each of the upper and lower bushings comprising an inner member comprising a tubular stem and a collar extending radially outwardly from the stem, and an outer member comprising a tubular portion surrounding the stem and a lip extending radially outwardly from the tubular portion adjacent the collar. The upper bushing extends from above the cross-member into a hole provided through the cross-member. The lower bushing extends from below the cross-member into the hole. A fastener extends through the hole from the lower bushing to the riser.

DETAILED DESCRIPTION OF THE PREFERRED EMBODIMENTS

Figure 1:
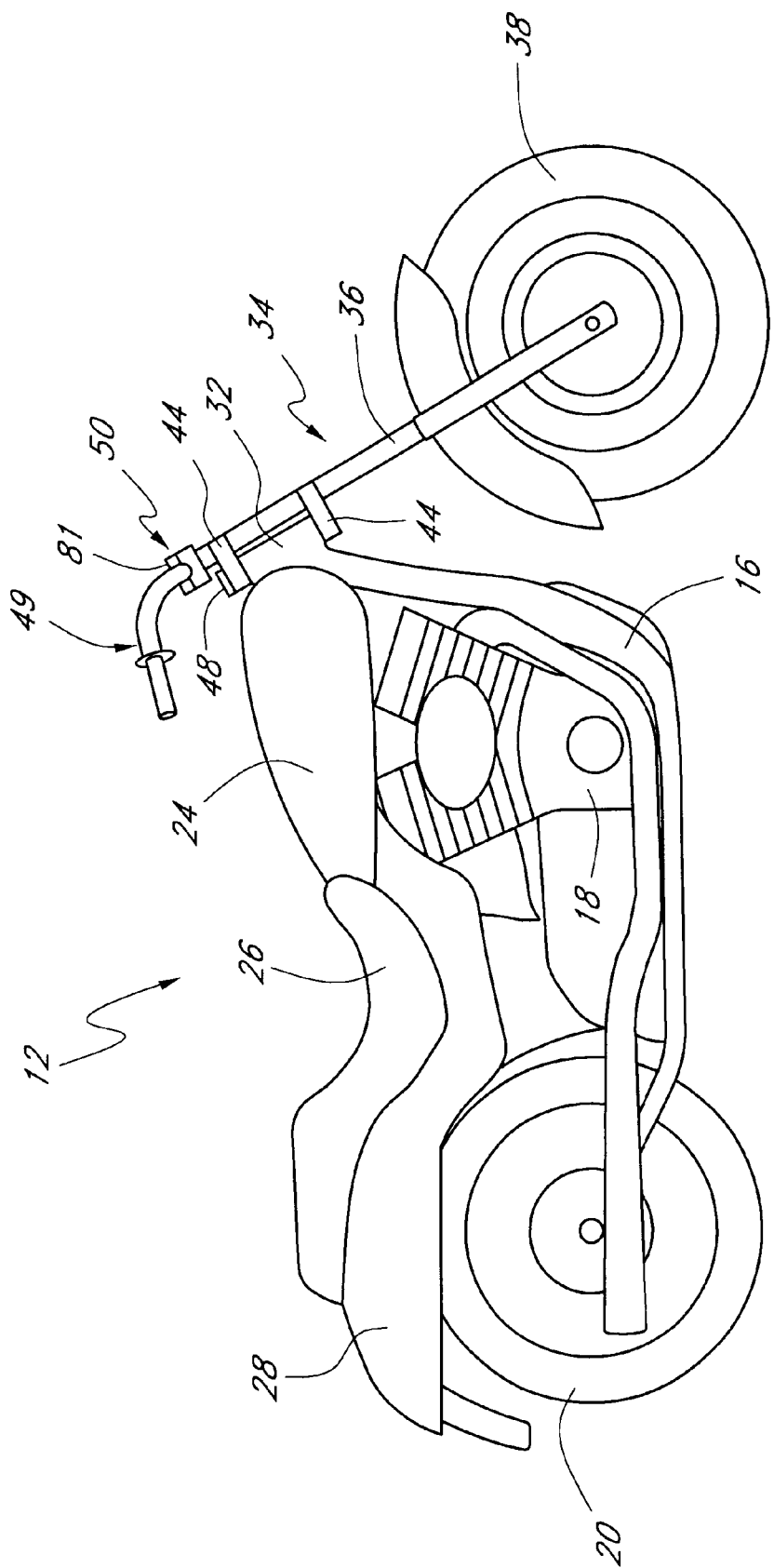
FIG. 1 is a side elevational view of a motorcycle having certain features and advantages in accordance with the present invention.

With reference initially to FIG. 1, a motorcycle is illustrated and indicated generally by the reference number 12. As is conventional, the illustrated motorcycle generally comprises a tubular frame assembly 16 on which an engine 18 is mounted. A rear wheel 20 is rotatably connected to the rear of the frame assembly 16 by a suitable rear suspension. The rear wheel 20 is driven by the engine 18 through a suitable drive train, as is well known in the art.

A fuel tank 24 is supported near a front end of the frame assembly 16 for supplying fuel to the engine 18. A seat 26 is mounted to the rear of the fuel tank 24 to accommodate an operator of the motorcycle 12. In the illustrated embodiment, the seat 26 extends over a rear fender 28 of the motorcycle 12 to accommodate a passenger in addition to the operator.

A tubular steering head 32 is provided at a front end of the frame assembly 16. A front fork assembly 34 is rotatably connected to the steering head 32. In the illustrated embodiment, the front fork assembly 34 comprises a pair of elongated fork legs 36 that extend downwardly and forwardly from the steering head 32. A front wheel 38 is rotatably connected between the lower ends of the fork legs 36, as is known in the art.

In the illustrated embodiment, the upper ends of the fork legs 36 are connected to a pair of cross-members 44 that extend between the fork legs 36. The upper cross-member 44 extends between the fork legs 36 above the steering head 32. The lower cross-member 44 extends between the fork legs 36 below the steering head 32. A shaft 48 extends through the steering head 32 from the lower cross-member 44 to the upper cross-member 44. The shaft 48 is journalled for rotation in the steering head 32 to allow rotation of the front fork assembly 34 with respect to the frame assembly 16.

The front fork assembly 34 is connected to a handlebar assembly 49 by a pair of riser assemblies 50, which are illustrated in greater detail in FIGS. 2–8. In the illustrated embodiment, the riser assemblies 50 are connected to the upper cross-member 44 of the fork assembly 34. The operator turns the handlebar assembly 49 to rotate the front fork assembly 34 and front wheel 38 to steer the motorcycle 12.

It is to be understood that the motorcycle 12 illustrated in FIG. 1 is merely exemplary. Those of skill in the art will recognize that the claimed invention is applicable to motorcycles of a variety of different types and configurations.

Figure 2:
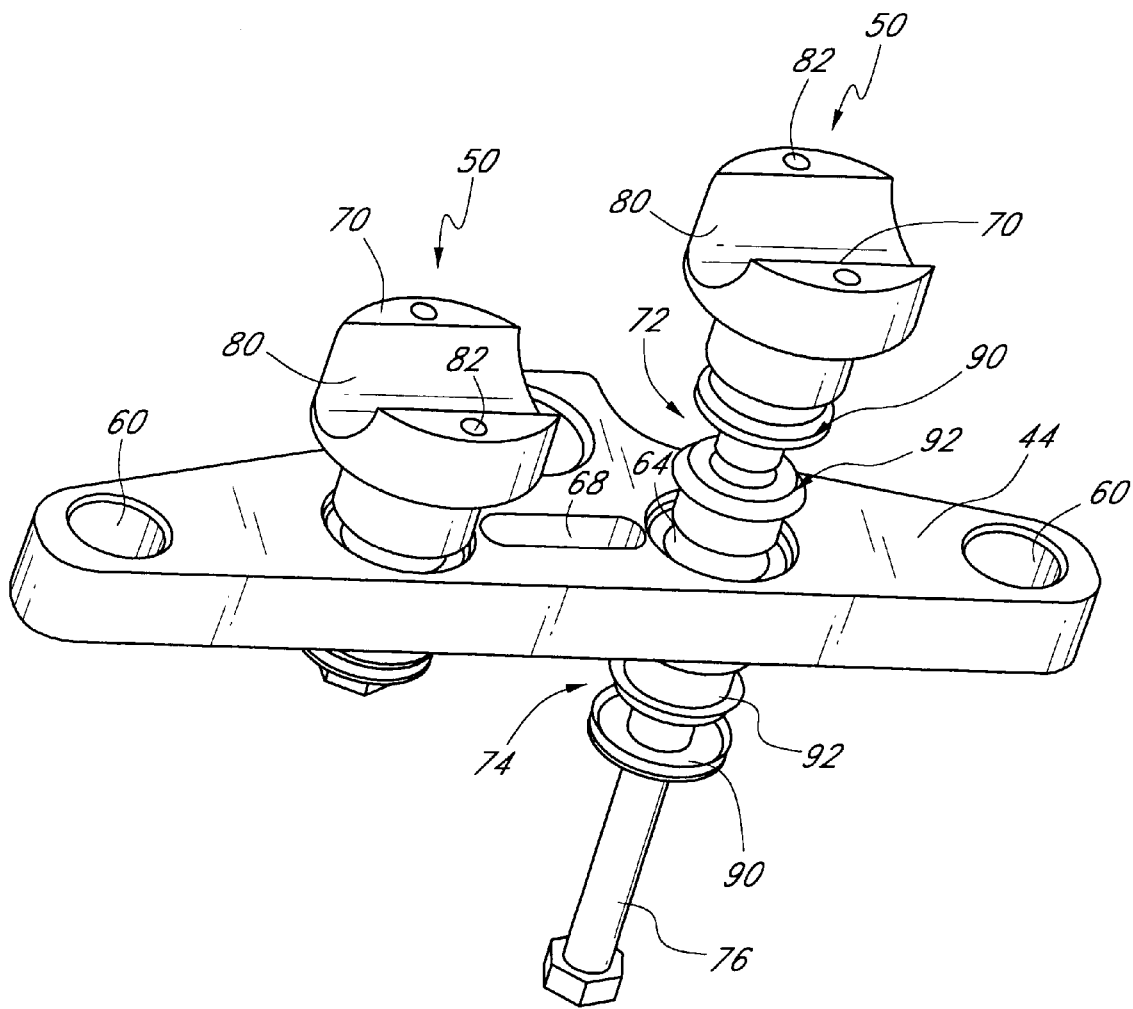
FIG. 2 is a perspective view of the top of the upper cross-member and riser assemblies of the motorcycle of FIG. 1.
Figure 3:
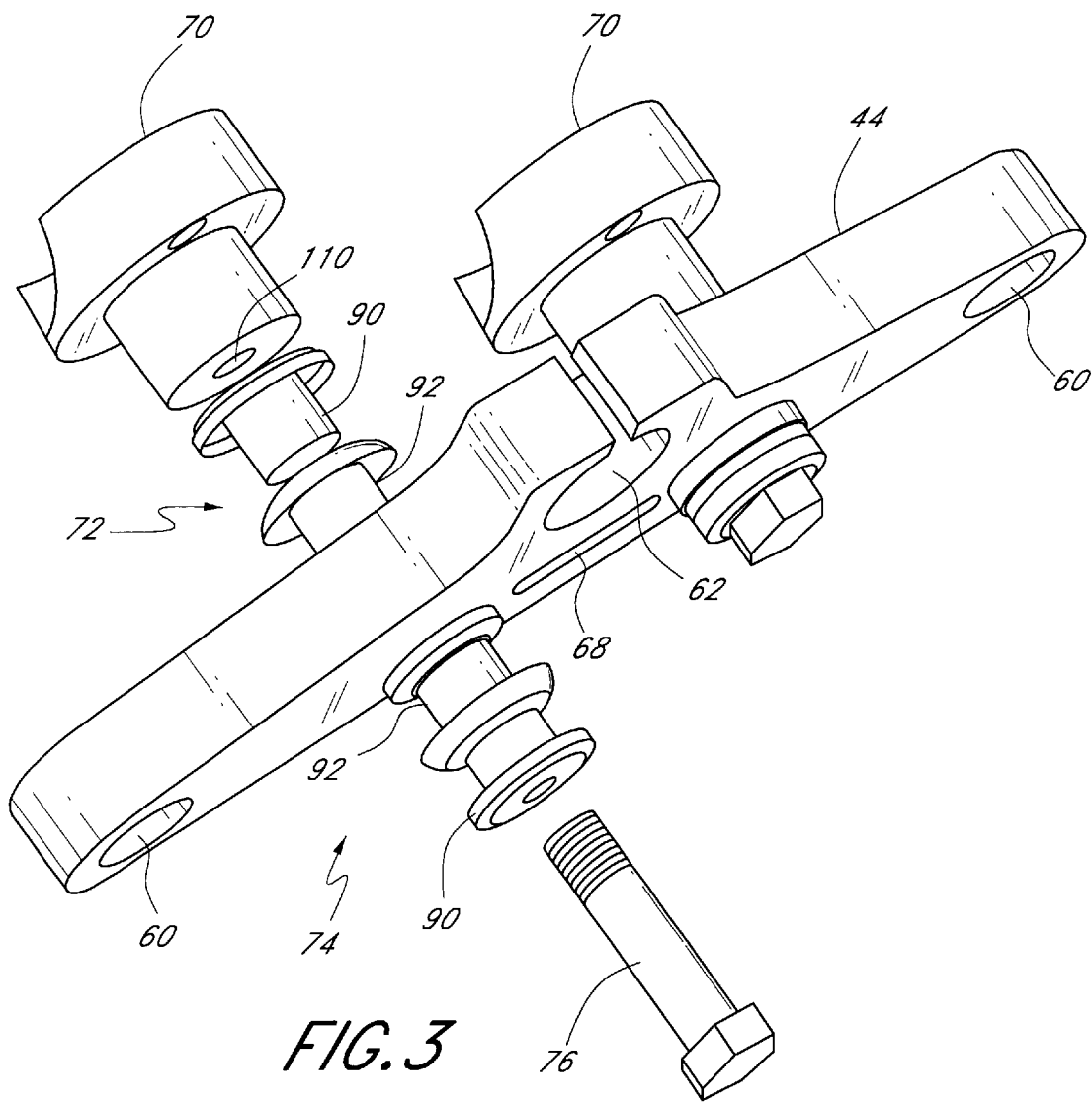
FIG. 3 is a perspective view of the bottom of the upper cross-member and riser assemblies.
Figure 4:
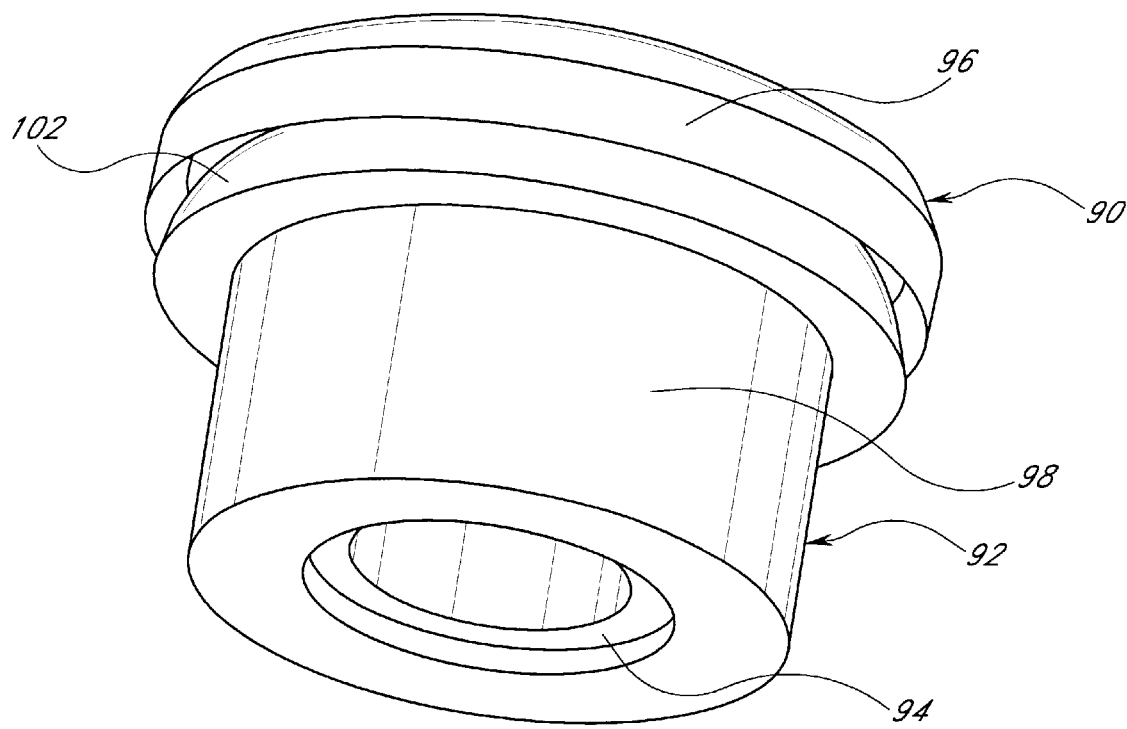
FIG. 4 is a perspective view of the upper bushing of one of the riser assemblies.
Figure 5:
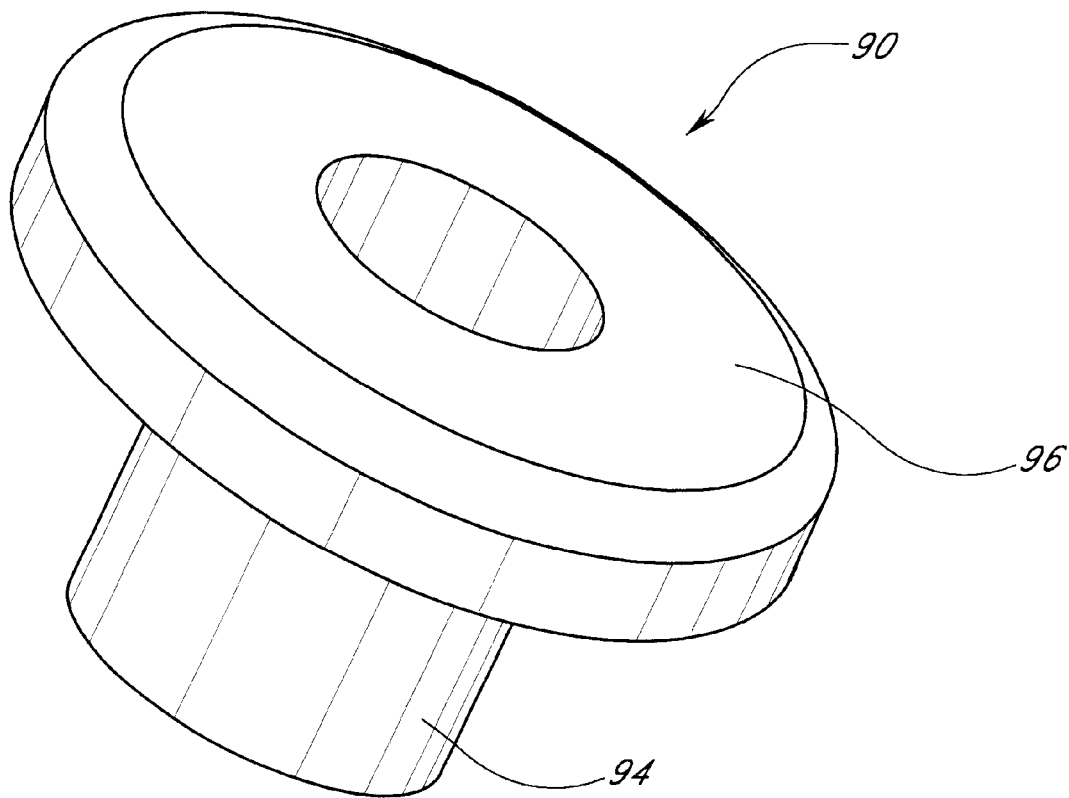
FIG. 5 is a perspective view of the inner member of the upper bushing.
Figure 6:
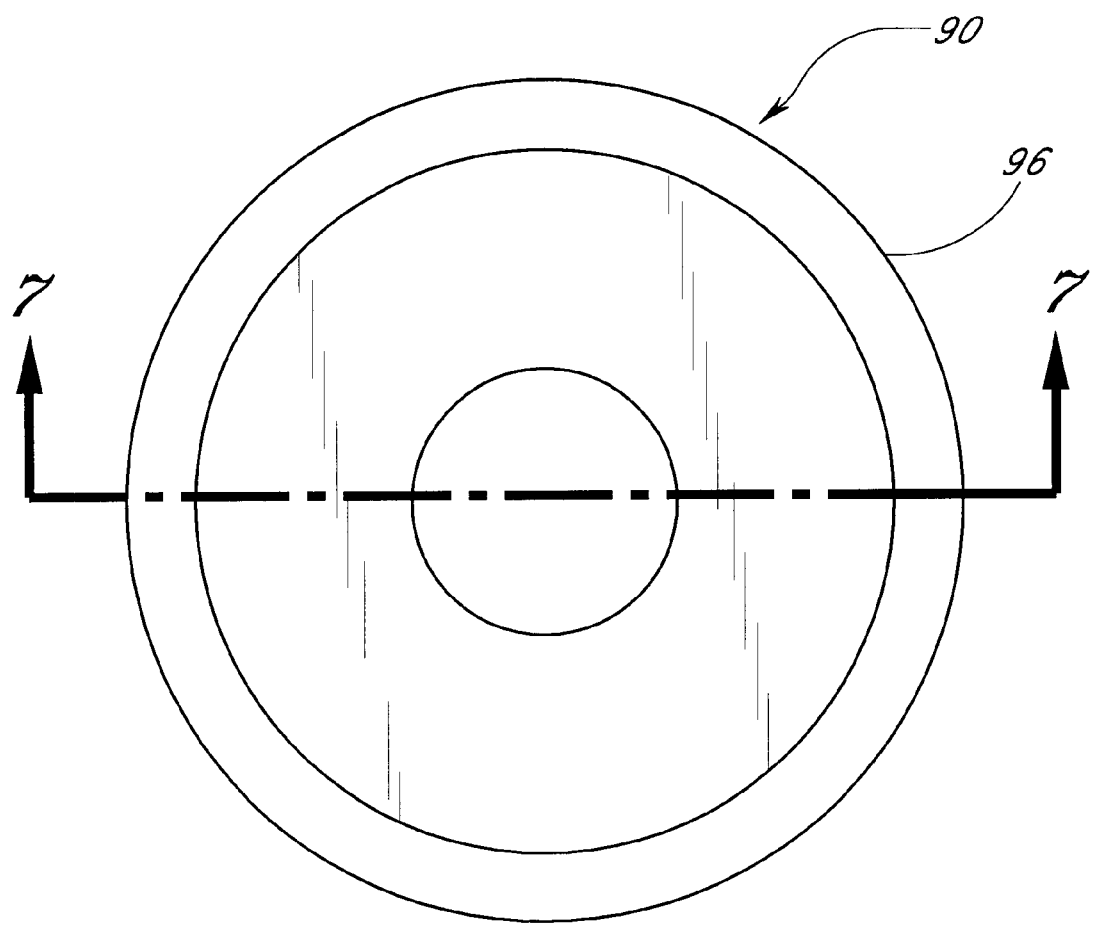
FIG. 6 is a top plan view of the inner member.
Figure 7:
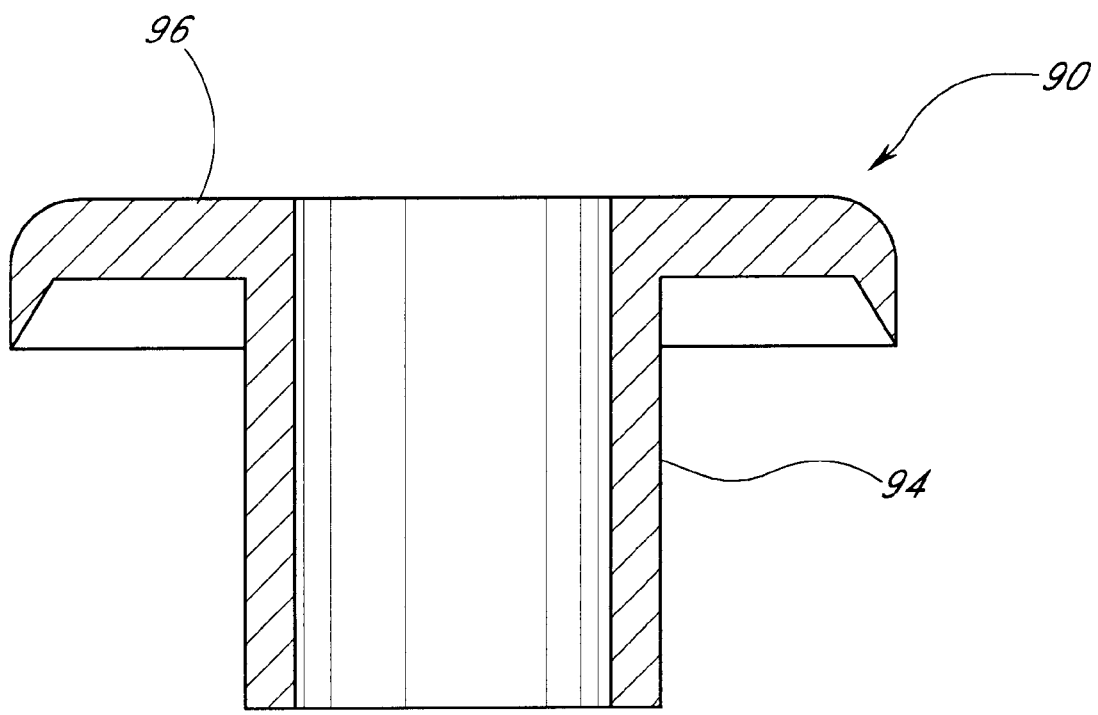
FIG. 7 is a cross-sectional view of the inner member taken along line 7—7 of FIG. 6.
Figure 8:
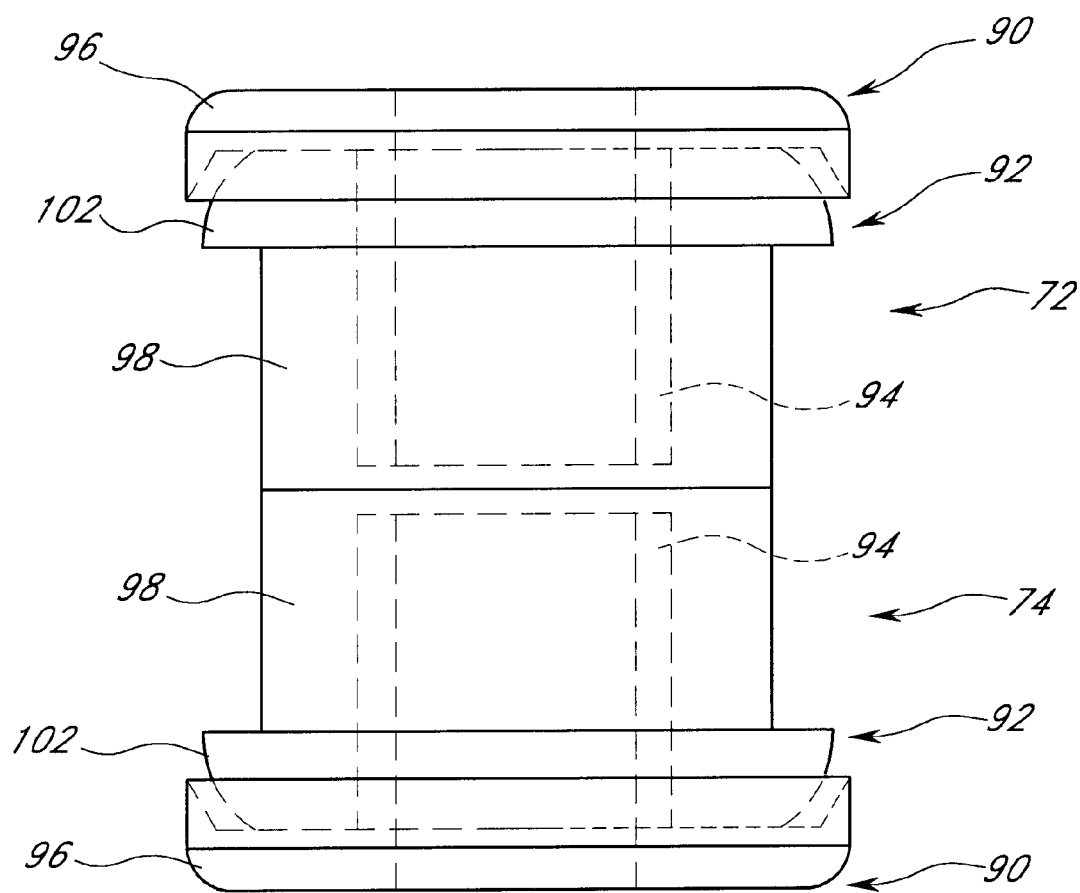
FIG. 8 is a side elevational view of the upper and lower bushings.

With reference now to FIGS. 2 and 3, the upper cross-member 44 and the riser assemblies 50 are illustrated. In the illustrated embodiment, the handlebar assembly 49 is connected to the front fork assembly 34 by two riser assemblies 50. It is to be understood, however, that a single riser assembly 50, or more than two riser assemblies 50, could instead be provided, depending on the type and contour of the handlebar assembly 49 used. As illustrated in FIGS. 2 and 3, a number of through holes are provided in the upper cross-member. A first pair of holes 60 is provided at the sides of the cross-member 44 to accommodate the ends of the fork legs 36. Another hole 62 is provided at the center of the cross-member 44 to allow passage of the shaft 48 extending through the steering head 32 of the frame assembly 16. A second pair of holes 64 is provided near the center of the cross-member 44 just forwardly of the central hole 62 for attachment of the riser assemblies 50. In the illustrated embodiment, a slot 68 is provided in the cross-member 44 between the second pair of holes 64 for passage of cables and/or electrical wires (not shown) from the front fork assembly 34 to the handlebar assembly 49 or frame assembly 16.

Referring still to FIGS. 2 and 3, each of the riser assemblies 50 comprises a riser 70, an upper bushing 72, a lower bushing 74, and a fastener 76. In the illustrated embodiment, the risers 70 have grooves 80 formed in the upper surfaces thereof to accommodate a tubular central portion of the handlebar assembly 49. The bottom of the central portion of the handlebar assembly 49 is supported in the grooves 80. A riser cap 81 (see FIG. 1) extends over the top of the central portion of the handlebar assembly 49. A pair of fasteners (not shown) extend from the riser caps 81 into a pair of threaded holes 82 in the risers 70 to secure the handlebar assembly 49 between the riser caps 81 and the risers 70. When the fasteners are tightened, the handlebar assembly 49 is clamped between the riser caps 81 and the risers 70 to prevent rotation of the handlebar assembly 49. The fasteners can be loosened to readjust the orientation of the handlebar assembly 49 in the grooves 80.

With reference now to FIGS. 4–8, in the illustrated embodiment, each of the upper and lower bushings 72, 74 comprises an inner member 90 and an outer member 92. The inner member 90 desirably comprises a tubular stem 94 and a collar 96 that extends radially outwardly from an end of the stem 94. The outer member 92 comprises a tubular portion 98 that surrounds the stem 94 and a lip 102 that extends radially outwardly from the tubular portion 98 adjacent the collar 96 of the inner member 90. Preferably, the outer member 92 is comprised of polyurethane, and the inner member is comprised of a rigid material, such as aluminum. For reasons to be discussed below, the tubular portion 98 of the outer member 92 preferably extends beyond the end of the stem 94 of the inner member 90 opposite the collar 96.

The stems 94 and the tubular portions 98 of the upper and lower bushings 72, 74 extend into the holes 64 in the upper cross-member 44, as illustrated in FIGS. 2 and 3. The lips 102 of the outer members 92 of the upper bushings 72 abut the upper surface of the cross-member 44. The lips 102 of the outer members 92 of the lower bushings 74 abut the lower surface of the cross-member 44. The lengths of the stems 94 are preferably such that the ends of the stems 94 do not contact one another when the lips 102 of the outer members 92 abut the upper and lower surfaces of the cross-member 44, leaving a gap between the stems 94. Preferably, the ends of the tubular portions 98 of the outer members 92 do contact one another when the lips 102 of the outer members 92 abut the upper and lower surfaces of the cross-member 44.

Referring to FIGS. 2 and 3, in the illustrated embodiment, the fasteners 76 comprise threaded fasteners that extend through the stems 94 of the inner members 90 of the upper and lower bushings 72, 74. The upper ends of the threaded fasteners 76 extend into threaded openings 110 (see FIG. 3) provided in the lower portions of the risers 70 to secure the risers 70 and the upper and lower bushings 72, 74 to the cross-member 44.

As the fasteners 76 are tightened, the upper and lower bushings 72, 74 are pressed towards one another. The gap between the stems 94 of the inner members 90 allows the inner members 90 to move towards one another. Since the tubular portions 98 of the outer members 92 are preferably already in contact with one another, the polyurethane outer members 92 are compressed, or "pre-loaded," as the fasteners 76 are tightened. This results in a rigid connection of the handlebar assembly 49 to the fork assembly 34 while nevertheless isolating the handlebar assembly 49 from engine and road vibrations.

Because the collars 96 of the inner members 90 desirably are formed integrally with the stems 94, the collars 96 are prevented from rocking on the ends of the stems 94. This provides a stable platform for the risers 70 and, thus, a more rigid connection of the handlebar assembly 49 to the fork assembly 34.

Although the invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. Thus, it is intended that the scope of the present invention herein disclosed should not be limited by the particular disclosed embodiments described above, but should be determined only by a fair reading of the claims that follow.

What is claimed is:

1. A steering assembly for a motorcycle, comprising:
   a front fork assembly comprising a pair of elongated fork legs, each of said fork legs having an upper end and a lower end, and a cross-member extending between said fork legs adjacent said upper ends;
   a handlebar assembly; and
   one or more riser assemblies connecting said handlebar assembly to said fork assembly, each of said riser assemblies comprising a riser extending between said handlebar assembly and said cross-member, an upper bushing, a lower bushing, each of said upper and lower bushings comprising an inner member comprising a tubular stem and a collar extending radially outwardly from an end of said stem, and an outer member comprising a tubular portion surrounding said stem and a lip extending radially outwardly from an end of said tubular portion adjacent said collar, said upper bushing extending from above said cross-member into a hole provided through said cross-member and said lower bushing extending from below said cross-member into said hole, and a fastener extending through said hole from said lower bushing to said riser to secure said riser assembly to said cross-member.

2. The steering assembly of claim 1, wherein said stems of said inner members and said tubular portions of said outer members extend into said hole in said cross-member, said lip of said outer member of said upper bushing abutting an upper surface of said cross-member, and said lip of said outer member of said lower bushing abutting a lower surface of said cross-member.

3. The steering assembly of claim 2, wherein said stems of said inner members of said upper and lower bushings do not contact one another when said lips of said outer members abut said upper and lower surfaces of said cross-member.

4. The steering assembly of claim 3, wherein said tubular portions of said outer members contact one another when said lips of said outer members abut said upper and lower surfaces of said cross-member.

5. The steering assembly of claim 3, wherein said tubular portions of said outer members extend into said hole a greater distance than said stems of said inner members.

6. The steering assembly of claim 3, wherein said fastener comprises a threaded fastener that extends through said stems of said inner members of said upper and lower bushings from said lower bushing to said riser.

7. The steering assembly of claim 1, wherein said inner members comprise aluminum.

8. The steering assembly of claim 1, wherein said outer members comprise polyurethane.

9. A riser assembly for a motorcycle having a handlebar assembly and a front fork assembly, said fork assembly comprising a pair of elongated fork legs and a cross-member extending between said fork legs, said riser assembly comprising:

a riser extending between said handlebar assembly and said cross-member, an upper bushing, a lower bushing, each of said upper and lower bushings comprising an inner member comprising a tubular stem and a collar extending radially outwardly from said stem, and an outer member comprising a tubular portion surrounding said stem and a lip extending radially outwardly from said tubular portion adjacent said collar, said upper bushing extending from above said cross-member into a hole provided through said cross-member and said lower bushing extending from below said cross-member into said hole, and a fastener extending through said hole from said lower bushing to said riser.

10. The riser assembly of claim 9, wherein said lip of said outer member of said upper bushing abuts an upper surface of said cross-member, and said lip of said outer member of said lower bushing abuts a lower surface of said cross-member.

11. The riser assembly of claim 10, wherein a gap is provided between said stems of said inner members of said upper and lower bushings when said lips of said outer members abut said upper and lower surfaces of said cross-member.

12. The riser assembly of claim 11, wherein said tubular portions of said outer members contact one another when said lips of said outer members abut said upper and lower surfaces of said cross-member.

13. The riser assembly of claim 9, wherein said fastener extends through said stems of said inner members of said upper and lower bushings from said lower bushing to said riser.

14. The riser assembly of claim 9, wherein said outer members comprise polyurethane.

* * * * *